Dec. 18, 1934.  A. JOHNSON  1,984,878

CHUCK LUBRICATING CONNECTER

Filed Feb. 1, 1932

Inventor
August Johnson
By
Attorney

Patented Dec. 18, 1934

1,984,878

UNITED STATES PATENT OFFICE 1,984,878

CHUCK LUBRICATING CONNECTER

August Johnson, Fargo, N. Dak., assignor to Jiffy Lubricator Company, Inc., Fargo, N. Dak., a corporation of North Dakota Application February 1, 1932, Serial No. 590,122

4 Claims. (Cl. 285—170)

My invention relates to a chuck lubricating connecter which is provided with means for engaging a smooth cylindrical shank projecting from a member adapted to be lubricated, the shank operating as a connecter and being provided with a valve which automatically closes the same when the chuck connecter is disengaged therefrom.

My chuck connecter is of a simple character, having a casing portion which is attached to a base portion, while the base portion is connected in a suitable manner to a flexible tube or other member leading from a lubricating gun or other source of lubricant, so that the lubricant may be readily carried to the chuck connecter.

Gripping jaws or members are supported within the casing of the chuck connecter in a manner to be free to move into and out of operating position. The gripping jaws are formed to freely engage over an annular bead formed on a core member, which is slidably supported within the casing. The core member rotatably supports a packing washer which forms a plunger end on the core member. This washer is supported in a peculiar manner and is provided with means for holding the same in proper operating position with the outer edges expanded toward the inner surface of the casing. The washer packing is removably supported together with its holding means to the core member so that it may be replaced when desired. The other end of the core member is hollowed out to provide a cylindrical receiving chamber for a packing washer and to receive the outer cylindrical or smooth end of a lubricating connecter which the chuck connecter is adapted to engage while forcing lubricant into the shank connecter.

A feature of the invention resides in a chuck lubricating connecter which may be quickly and easily attached to a cylindrical shank-like lubricating connecter carried by a bearing or any other member which is adapted to be lubricated and it is only necessary to push my chuck lubricating connecter on to the shank of the connecter carried by the member to be lubricated, and then by the action of lubricant passing through my chuck connecter to the lubricating shank, the chuck will automatically operate to engage the lubricating shank and hold the chuck in operative position so long as lubricating pressure is passing through the same. Just as soon as the lubricating pressure subsides, my chuck connecter may be readily removed without any suction on the shank connecter and therefore, I provide a lubricating connecter having the advantage of not drawing back any dirt off of the shank connecter into the chuck connecter. My chuck lubricating connecter is aided in its disengagement from the cylindrical surface of the shank connecter by the gripping jaws which are formed in segments so as to provide slots between the adjacent edges of the same so as not to form an air pocket in the outer working end of my chuck connecter. This overcomes any disengaging suction of the chuck from the shank connecter and therefore has the advantage over former types of connecters because no dirt is picked up from the shank connecter by suction in the chuck connecter.

The full detail and features of my chuck lubricating connecter will be set forth, as well as the peculiar arrangement of the parts and the construction thereof.

In the drawing forming a part of this specification:

Figure 1:
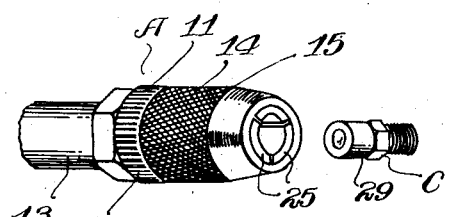
Figure 1 illustrates a perspective showing the outer working end of my chuck connecter adjacent to a lubricating shank connecter.

My chuck connecter A is formed with a base portion 10 which is knurled on the outer surface at 11 and is formed with a reduced threaded end 12 to which the flexible tube 13 leading from the source of supply of the lubricant is connected. The tube 13 is broken away, however, it may be connected to any source of supply of lubricant such as is commonly known as a lubricating pressure gun or other source of lubricant so as to carry a supply of lubricant into the chuck A.

The chuck A is formed with a casing 14 projecting from the base 10 which is also knurled at 15 on the outer surface thereof and the forward end 16 of the casing is tapered or bevelled off. The inner surface 17 of the forward end 16 of the casing 14 is also tapered to provide a working surface for chuck jaws which will be later described.

The casing 14 is formed with an inner chamber 18 having an inner cylindrical working surface 19. Within the chamber 18, I provide an operating core member B which has a head portion 20 formed to fit fairly close to the working surface 19. Projecting from one side of the head member and formed integrally therewith is a cylindrical tubular portion 21. On the outer surface of the portion 21 near the head portion 19, I provide an annular projecting bead 22 while the outer end of the tubular portion 21 is formed with a cylindrical opening 23 in which a flexible packing washer 24 is loosely disposed. The washer 24 is held, however, with sufficient frictional contact with the surface 23 to prevent the same from sliding too freely within the end of the tubular member 21.

The tubular end 21 is adapted to support around the outer surface thereof the operating jaws 25 by means of the annular bead or shoulder 22 which projects from the tube 21. The base of each jaw is formed with a complemental groove 26 which engages over the shoulder 22 and in this manner the jaws 25 are held freely disposed on the outer end of the tube 21. The casing 14 guides and holds the jaws 25 in operating position.

Figure 2:
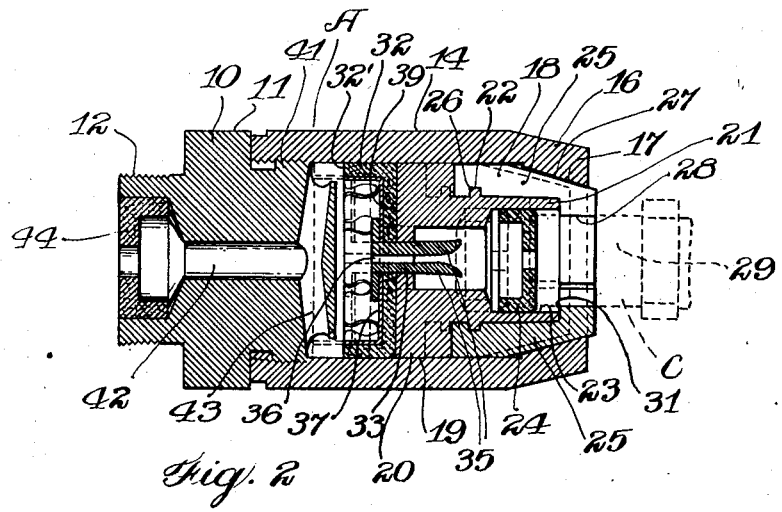
Figure 2 is a longitudinal section through my chuck lubricating connecter, showing the parts in operative position, while lubricant would be passing therethrough.
Figure 3:
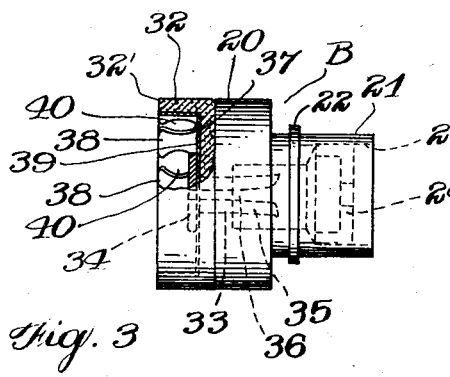
Figure 3 is a side view partially broken away of the core member carried in the casing of the chuck connecter.

The outer ends of the outer surface of the jaws 25 are bevelled at 27 so as to engage with the beveled surface 17 in the casing and the inner portions of the outer ends of the jaws 25 are formed with an arcuate gripping surface 28 which is of a broad nature, as illustrated in Figure 2 to provide a substantially cylindrical gripping means in the outer ends of the jaws 25 when they are in working position engaging the cylindrical shank 29 of the nipple connecter C.

Thus, the jaws 25 provide a means of firmly engaging the smooth outer surface 29 of the nipple connecter C when the chuck A is in operation to provide a lubricating connecter between the source of supply of lubricant through the tube 13 to permit grease to be injected through the connecter C and to any bearing or member to which the connecter C is attached.

The chuck jaws 25 provide an inner annular shoulder 31 which is positioned adjacent the outer end of the tubular portion 21 and this shoulder assists in maintaining the washer 24 within the cylindrical chamber 23 of the tubular member 21.

The inner end of the core member B is adapted to removably and rotatably support the packing washer 32 by means of the hollow spring rivet member 33. The rivet member 33 is formed with a head portion 34 and spring finger expanding ends 35. The ends 35 project through an axial opening formed in the core member B and a small axial opening 36 is formed in the rivet 33. The packing washer 32 is adapted to be held in operative position by the spring expander plate 37 which is formed with spring fingers 38 extending approximately at a right angle or slightly greater than a right angle from the body portion 39 of the plate 37. These spring ends 38 press toward the outer peripheral portion 32' of the washer 32 to cause the same to be forced toward the working surface 19 of the chamber 18 at all times. The openings 40 between the spring fingers 38 permit lubricant pressure to assist in forcing the peripheral portion 32' toward the working surface 19 when lubricant is passing through the chuck A.

The base portion 10 of the chuck A supports the casing 14 by the threaded end 41 formed on the base portion 10 and I provide an axial lubricating opening 42 extending into the base 10 which connects with the transversely extending lubricating passageways 43 formed in the portion of the base 10 extending into the casing 14, so that lubricant coming through the tube 13 passes through a packing washer 44 in the base portion 10 and through the comparatively large passageway 42 to the passageways 43 which direct the lubricant transversely instead of straight axially through the inner end of the base 10. This is an important feature because it causes a lubricant passing out of the openings 43 to be extended directly toward and against the inner portion of the peripheral part 32' of the packing washer 32 passing through the openings 40 against this portion 32' to cause the packing washer 32 to operate efficiently at all times as a packing plunger on the end of the core member B. The free rotative mounting of the packing washer 32 permits it to adjust itself into proper working position. The comparatively small opening 36 through the rivet 33 causes the lubricant coming into the chuck A to build up a pressure and force the core member B with the gripping jaws 25 against the surface 17 and providing a gripping chuck having considerable direct gripping force to firmly engage around the cylindrical surface of the connecter C and cause the chuck A to be securely attached thereto while lubricant passes through the same and through the connecter C. In fact, the lubricant will not pass out of the chuck A until the jaws 25 are firmly gripping with considerable force the smooth surface of the connecter C. Thus, I provide a very efficient gripping chuck lubricating connecter for directing a lubricant to the connection C which may be easily attached or disengaged therefrom with further advantages as will be hereinafter pointed out.

Each jaw 25 is a separate element or segment from each other jaw 25 and these jaws are held freely to the core member B by the projecting bead 22. By supporting the jaws 25 in this manner, a slit or opening is provided between each jaw member. Thus, when the jaws grip the nipple 29, they cannot adhere to the same by suction after the pressure in the chuck has subsided in lubricating a joint or bearing, but rather air can pass along these slits between the jaws 25 and instantly release the chuck from the shank 29. Devices heretofore for lubricating have maintained a suction with the idea of drawing the surplus lubricant away from the shank 29 back into the connection. This is very objectionable as it tends to draw sand or dirt into the connecter of whatever type the same may be and sooner or later the connecter must be cleaned of this grit or dirt because otherwise the same would be injected into the bearing.

The washer 24 provided a packing joint against the end of the shank 29 during the process of lubricating. The washer 32 may be readily removed by engaging the head 34 of the rivet 33 and withdrawing the spring arms 35 from the opening in the core member B. The spring ended plate 39 keeps the peripheral portion 32' of the washer 32 in engagement with the surface 19 of the chamber 18 to provide a tight packing joint and permit the core member B to act as a plunger to operate the jaws 25 into gripping position. The plate 39 provides a bearing for one side of the bead 34 and permits the washer 32 to rotate sufficiently to adjust itself in operation. With this core member B operated by the pressure of the lubricant build up against the packing 32, the gripping jaws 25 are forced with considerable pressure against the beveled surface 17 which causes the ends 28 of these jaws to grip very firm and securely to the smooth surface of the shank 29, thereby maintaining the chuck lubricating connecter in operative position while lubricant is being forced under pressure to the same.

The construction of my chuck lubricating connecter is simple, the parts are arranged in a manner to operate effectively and I have found this chuck lubricating connecter to be very adaptable for the purposes for which it is designed. The parts may be readily replaceable and the construction is inexpensive yet very effective in not only operation but in use because this connecter can be so quickly secured to the shank such as 29. In use it is only necessary to slip the jaws 25 over the shank and apply the lubricant pressure and the jaws will automatically move forward and grip the shank very securely. Virtually instantly upon the subsiding of the pressure in the chuck, the jaws are released from the shank 29, permitting the chuck to be removed from engagement with the shank without any suction and permitting the jaws 25 to move backward in the chamber 18 with the core member B.

In accordance with the patent statutes, I have described the construction of my chuck lubricating connecter and while I have described and illustrated in a particular formation and adaptation thereof, the same may be applied to other uses and carried out by other means within the scope of the following claims within the purpose and intent of my invention.

I claim:

1. A chuck lubricating connecter including, a casing, a base for supporting said casing, a lubricating connection for a source of lubricant to said base, a lubricant opening through said base, packing means in said base, segmental gripping jaws slidably supported in said casing, a reciprocable core member for supporting and engaging said jaw members freely, a washer packing carried by said core member in the front end thereof, a washer packing carried by the other end of said core member freely rotatable and removable from said core member, and a spring metal plate on one side of said packing member having spring fingers for urging a portion of said last mentioned packing into operative position.

2. A chuck lubricating connecter including, means for securing said chuck to a source of lubricant, a passageway into said chuck for lubricant from a source thereof, a core member in said chuck, gripping jaws freely carried by said core member, a recess and gasket in one end of said core member for receiving a lubricating connecter therein with said jaws engaging about said lubricating connecter when fitting into said core member against said gasket, a reinforced gasket rotatably and removably secured to and supported to the other end of said core member, and means for directing lubricant from a source of supply into said chuck connecter and to direct the same toward said reinforced gasket.

3. A lubricating chuck connecter including, a series of gripping jaws formed of segments and having a broad gripping surface to engage about a smooth cylindrical connecter, a reciprocable core member for supporting said jaws, means on said core interlocking with said jaws to move the jaws with said core, means for directing lubricant against said core member from oppositely disposed equalizing openings of comparatively large size, and a restricted opening through said core member whereby when lubricant is directed against said core member pressure will be built up and cause said core member to move said jaws into gripping position while lubricant passes through said chuck connecter.

4. A lubricating chuck connecter comprising, a base member including a lubricant supply connecter member, and a lubricant opening therethrough, a sleeve connected to said base, a slidable core in said sleeve, an opening through said core, a cup-shaped washer within said sleeve, hollow means for removably securing said washer to said core and for permitting a flow of lubricant therethrough, a protruding portion on said base over which said cup-shaped washer fits in one extreme position of said core, jaws between said core and said sleeve and extending beyond said core to grip a connecter, means on said core for holding said jaws in position, and tapered shoulder means on said sleeve engageable with said jaws to force the same inwardly when said core is moved toward the other extreme position.

AUGUST JOHNSON.